United States Patent

Lelle

[11] Patent Number: 5,992,406
[45] Date of Patent: Nov. 30, 1999

[54] COLLAPSIBLE AND NESTABLE STEAM TABLE

[76] Inventor: Steven H. Lelle, 148 Bethesda Church Rd., Lawrenceville, Ga. 30044

[21] Appl. No.: 09/010,878

[22] Filed: Jan. 22, 1998

[51] Int. Cl.⁶ ........................................... F24B 9/00
[52] U.S. Cl. ................. 126/33; 126/9 R; 126/43
[58] Field of Search ............ 126/33, 9 R, 25 R, 126/38, 40, 44, 50, 43, 9 B, 275 R; 99/449

[56] References Cited

U.S. PATENT DOCUMENTS

| | | |
|---|---|---|
| 3,858,495 | 1/1975 | Gotwalt . |
| 4,126,116 | 11/1978 | McCallum . |
| 4,149,514 | 4/1979 | Latouf . |
| 4,455,992 | 6/1984 | Hsiao . |
| 4,624,238 | 11/1986 | Hait . |
| 4,714,013 | 12/1987 | Telfer . |
| 4,794,906 | 1/1989 | Longley, Jr. . |
| 4,829,975 | 5/1989 | Hait . |
| 4,884,551 | 12/1989 | Hait . |
| 5,287,800 | 2/1994 | Orednick ........................ 126/9 R |
| 5,467,697 | 11/1995 | Hunziker ............................ 126/33 |
| 5,517,903 | 5/1996 | Kaufman . |
| 5,526,802 | 6/1996 | Riezenman . |

FOREIGN PATENT DOCUMENTS

| | | | |
|---|---|---|---|
| 60709 | 1/1892 | Germany ............................. 126/9 R |
| 507939 | 1/1955 | Italy . |
| 308104 | 3/1929 | United Kingdom . |

*Primary Examiner*—James C. Yeung
*Attorney, Agent, or Firm*—Hinkle & Associates, P.C.

[57] ABSTRACT

A collapsible and nestable steam table (10) comprises a foldable frame (20), at least one tray (30) and a foldable top section (40) capable of receiving and storing both the frame and the at least one tray. The frame has a front plate(21), a rear plate (22) and a pair of folding end plates (23) pivotally mounted thereto to collapse the frame. The at least one tray is removably disposed within the frame to prevent the end plates from folding toward each other while the steam table is in use. The top member comprises C-shaped first and second shells (45, 46) each having an extension member (47) and a first arm, a second arm and a third arm (48, 49, 50) extending outwardly therefrom. The first, second and third arms of the first shell are respectively pivotally mounted to the first, second and third arms of the second shell. Each arm has protrusions and tabs extending outwardly therefrom, and the protrusions and tabs of a given arm are spaced-apart a sufficient distance to removably receive the frame and the at least one tray. The frame and the at least one tray are placeable between the protrusions and tabs and secured within the top member by pivoting the first and second shells into contact with each other.

21 Claims, 4 Drawing Sheets

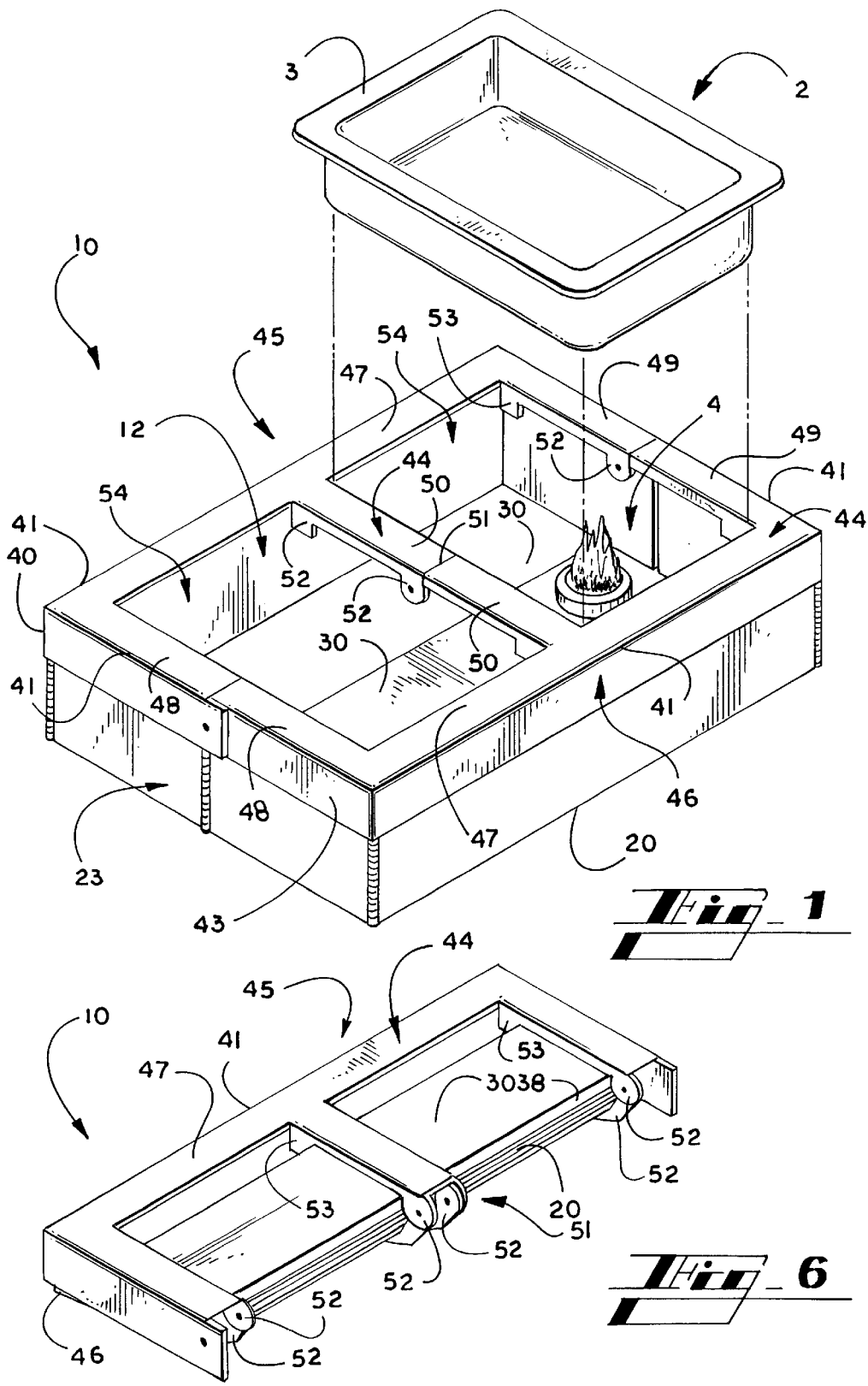

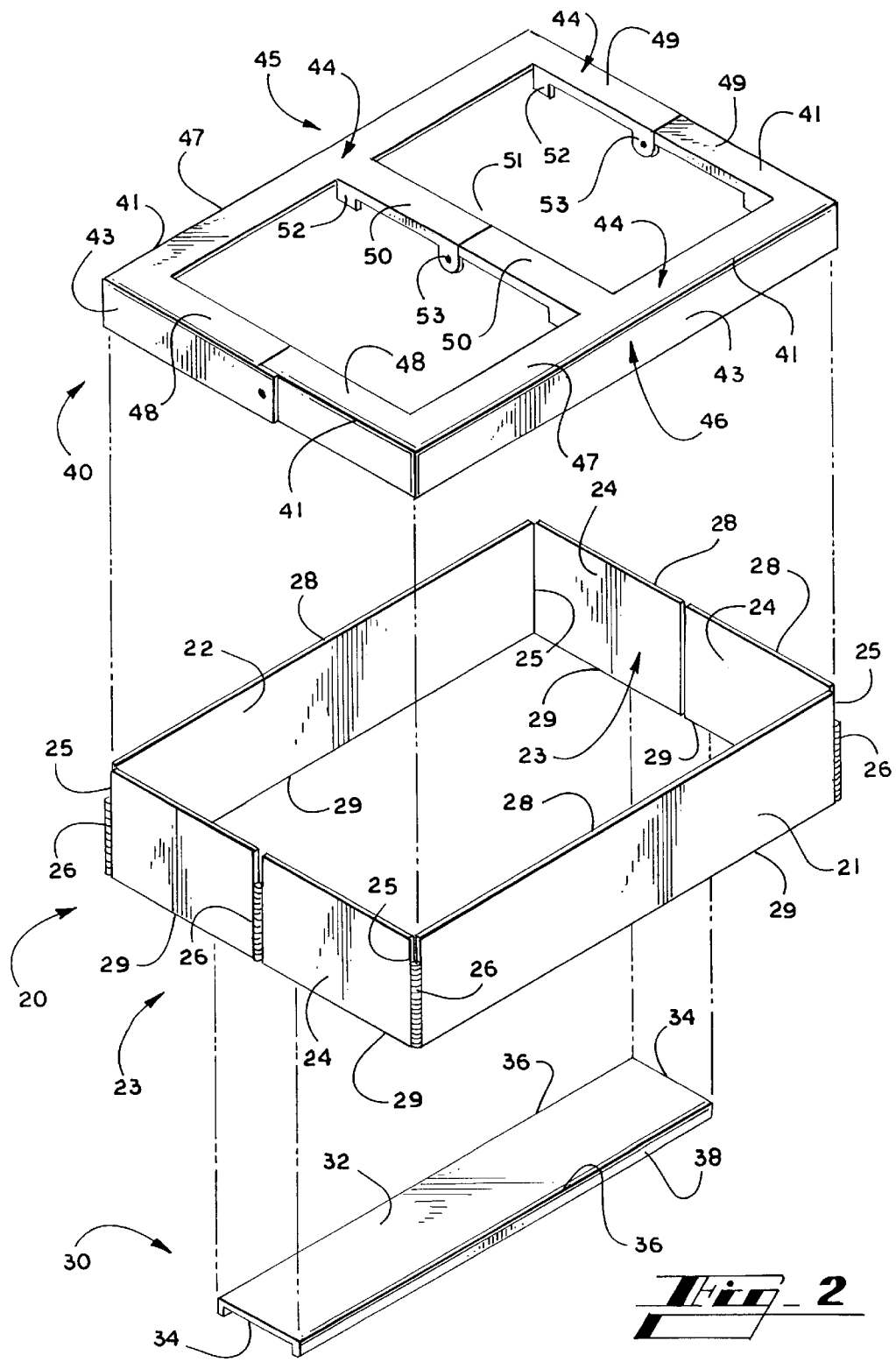

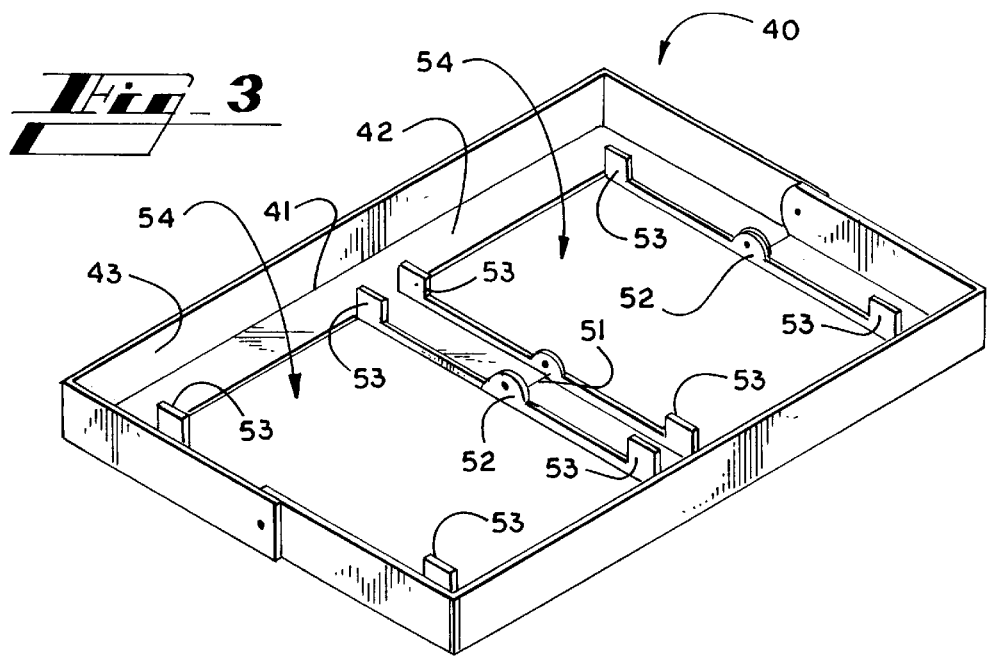
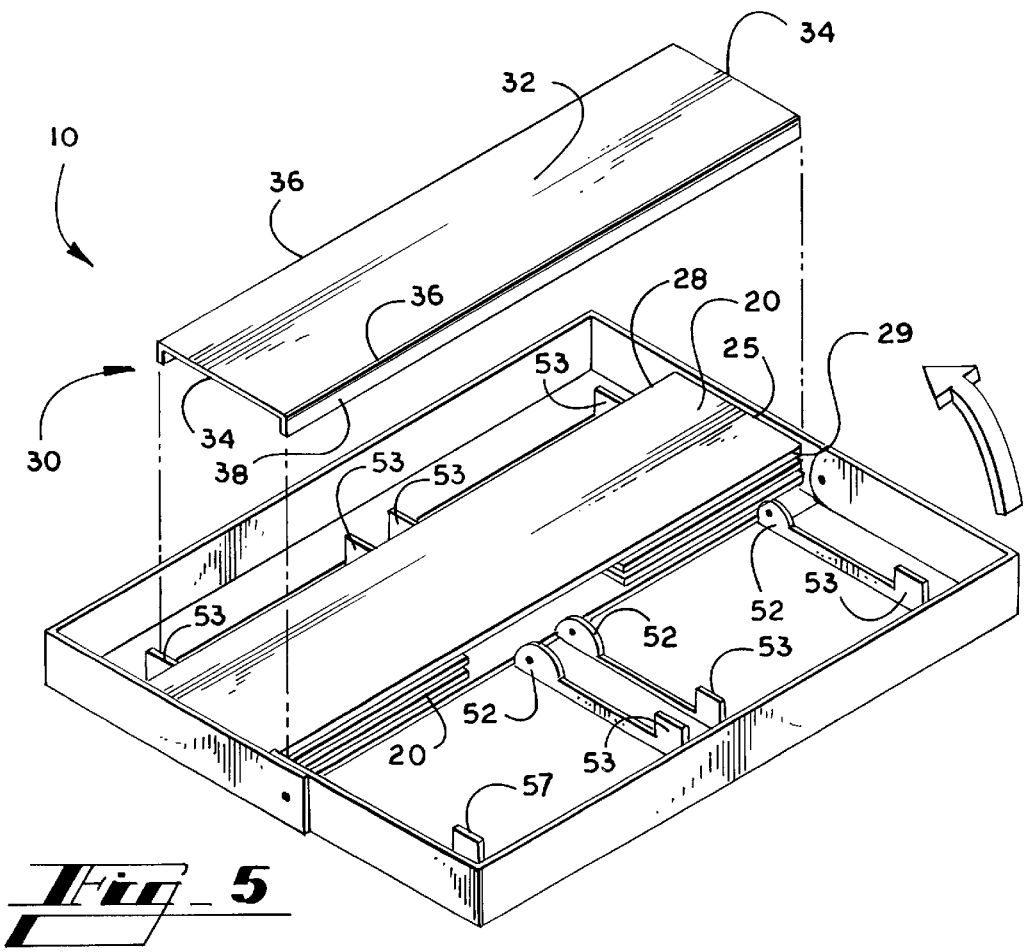

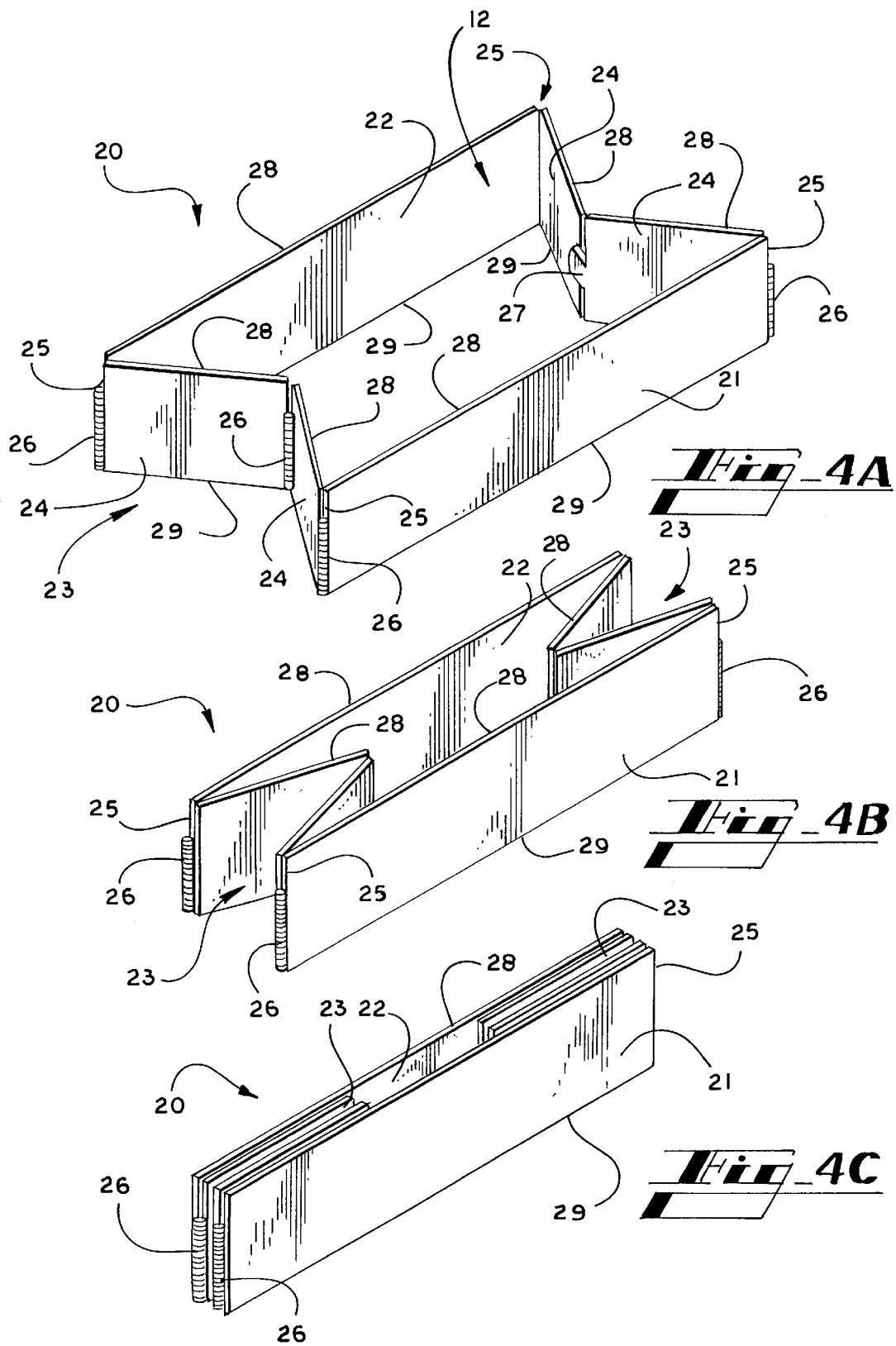

COLLAPSIBLE AND NESTABLE STEAM TABLE

BACKGROUND OF THE INVENTION

I. Field of the Invention

The present invention relates generally to the field of catering equipment. More particularly, the present invention relates to a portable steam table that is collapsible and capable of nesting within itself.

II. Description of the Related Art

Food catering services typically serve prepared foods from a buffet line having a plurality of serving pans. A problem arises, particularly in the outdoor setting, of providing heat to the serving pans containing foods which are to be served at elevated or warm temperatures. Often, the serving pan is placed within a double-boiler pan supported by a stand for both holding the double-boiler pan and positioning a heat source thereunder. The double-boiler pan is partially filled with water and the serving dish is nested within it. In this manner, heat from the heat source, typically a candle or a fuel can, such as manufactured under the trademark, STERNO, is used to transfer heat to the water in the double-boiler pan from whence it is transferred through vapor convection to the serving pan and the food therein.

The stand commonly is a four-sided frame having the respective sides rigidly mounted to one another at their intersections, thereby defining corners. Legs rigidly extend downward from the corners to elevate the frame with respect to a surface that supports the stand. There is generally sufficient distance between the surface and the double-boiler pan to place the heat source therebetween. However, the stand offers little or no protection from breezes often encountered in the outdoor setting. The breezes make heat regulation from the heat source to the double-boiler pan difficult and cause additional fuel use. Further, the breezes can extinguish the flame of the heat source, which results in an undesired cooling of the food in the serving dish. Additionally, since a caterer typically transports all needed equipment and food from the caterer's location to the event location, the rigid stand is not readily storable, thereby taking up needed space and presenting problems.

Several types of collapsible cooking devices or chafing dishes have been devised. In U.S. Pat. No. 3,858,495 issued to Gotwalt, a cooking device, as shown in FIGS. 1 and 2 thereof, has a frame and four sides, each of which is movably attached to adjacently positioned sides by means of a hinge member connected to each of the side extremities. The frame and its sides generally are arranged in a rectangular configuration, but the shape of the frame by virtue of the hinge members can be varied. Two of the sides, which are opposite one another, respectively have first and second portions, and the interior ends of the portions are pivotally connected by another hinge member.

Hsiao in U.S. Pat. No. 4,455,992 describes a folding roaster. The roaster has a front trapezoid plate, a rear trapezoid plate, two folding side plates respectively pivotally mounted to the front and rear trapezoid plates, and three screens. The uppermost screen is placed on top edges of the plates for roasting use. The bottom two screens are for supporting burning charcoal and wood, respectively. As with Gotwalt, the folding side plates have first and second portions, and the interior ends of the portions are pivotally connected by a hinge.

A portable, collapsible field stove, described in U.S. Pat. No. 4,794,906 issued to Longley, Jr., has a front plate, a back plate, a pair of end plates respectively pivotally mounted to the front and black plates, and a bottom plate pivotally mounted to the back plate. In the same manner as Gotwalt and Hsiao, the end plates have first and second portions, and the interior ends of the portions are pivotally connected by a hinge. The bottom plate removably engages the front plate to prevent the stove from collapsing while in use.

A portable, collapsible chafing dish described by Kaufman in U.S. Pat. No. 5,517,903 has a collapsible stand and a tray. The collapsible stand has four hinged members, two of which being a pair of oppositely disposed lateral sides and the other two being a pair of oppositely disposed ends respectively pivotally connected to the lateral sides. Apertures having lower edges are provided in the ends. At each end of the tray are capturing lips to respectively, removably engage the lower edges of the apertures, thereby preventing the chafing dish from collapsing and adding structural strength.

SUMMARY OF THE INVENTION

In accordance with the present invention and the contemplated problems which have and continue to exist in this field, one of the objectives of this invention is to provide a collapsible and nestable steam table that is new and unique over the prior art.

It is another object of the present invention to provide a collapsible and nestable steam table which comprises a collapsible frame, a tray and a foldable top member.

Still, it is another object of the present invention to provide a top member that has a pair of shells that are pivotally mounted to one another that provide openings to receive serving or double-boiler pans therein.

Yet, it is another object of the present invention to provide a pair of shells having a plurality of arms and the arms have protrusions and tabs to releasably secure a frame and one or more trays therein for transport and storage.

Also, it is another object of the present invention to provide a pair of shells which are pivotally mounted to each other at their respective protrusions, thereby enabling the top member to pivot and fold, thereby securing a frame and one or more trays between protrusions and tabs of both shells.

This invention accomplishes the above and other objectives and overcomes the disadvantages of the prior art by providing a collapsible and nestable steam table that is simple in design and construction, inexpensive to fabricate, and easy to use. The steam table comprises a foldable frame, at least one tray and a foldable top section capable of receiving and storing the frame and the at least one tray. The frame has a front plate, a rear plate and a pair of folding end plates pivotally mounted thereto to collapse the frame. The at least one tray is removably disposed within the frame to prevent the end plates from folding toward each other while the steam table is in use. The top member comprises C-shaped first and second shells each having an extension member and a first arm, a second arm and a third arm extending outwardly therefrom. The first, second and third arms of the first shell are respectively pivotally mounted to the first, second and third arms of the second shell. Each arm has protrusions and tabs extending outwardly therefrom, and the protrusions and tabs are spaced-apart a sufficient distance to removably receive the frame and the at least one tray. The frame and the at least one tray are placeable between the protrusions and tabs and secured within the top member by pivoting the first and second shells into contact with each other.

It is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Other objects, advantages and capabilities of the invention will become apparent from the following description taken in conjunction with the accompanying drawings showing preferred embodiments of the invention.

BRIEF DESCRIPTION OF THE DRAWINGS

The invention will be better understood and the above objects as well as objects other than those set forth above will become apparent when consideration is given to the following detailed description thereof. Such description makes reference to the annexed drawings wherein:

FIG. 1 is a perspective view of an embodiment of a collapsible and nestable steam table made in accordance with the present invention;

FIG. 2 is an exploded, perspective view of the embodiment of FIG. 1;

FIG. 3 is a perspective view of a top member;

FIGS. 4A, 4B and 4C are perspective views of a frame is various stages of collapse for storage;

FIG. 5 is an exploded, perspective view of the nesting table with the collapsed frame disposed therein and a tray; and FIG. 6 is a perspective view of the folded top member securing the frame and the tray therein.

The reference numbers in the drawings relate to the following:
2=pan
3=lip of pan
4=heat source
10=collapsible and nestable steam table
12=interior of steam table
20=frame
21=front plate
22=rear plate
23=end plate
24=section of end plate
25=side edge
26=hinge
27=stop
28=top edge
29=bottom edge
30=tray
32=platform of tray
34=outer ends of tray
36=outer edges of tray
38=sides of tray
40=top member
41=peripheral edge of top member
42=bottom surface of top member
43=peripheral wall of top member
44=top surface of top member
45=first shell
46=second shell
47=extension member
48=first arm
49=second arm
50=third arm
51=pivot end of arms
52=protrusion
53=tab
54=opening

DESCRIPTION OF THE PREFERRED EMBODIMENTS

For a fuller understanding of the nature and desired objects of this invention, reference should be made to the following detailed description taken in connection with the accompanying drawings. Referring to the drawings wherein like reference numerals designate corresponding parts throughout the several figures, reference is made first to FIG. 1. FIG. 1 of the drawings illustrates a collapsible and nestable steam table 10 capable of supporting one or more pans 2 having lips 3, such as a double-boiler pan or serving pan. The steam table 10 has an open interior 12 for receiving a heat source 4, typically a candle, burner or a fuel can, such as manufactured under the trademark, STERNO, to heat food or water placed into the pan 2. As shown in FIGS. 1 and 2, the steam table 10 comprises a folding frame 20, a tray 30 removably placeable within the frame 20, and a folding top member 40. The tray 30 is adapted to removably receive the folded frame 20, and the top member 40 is adapted to removably engage and secure both the tray 30 and the frame 20 while the top member 40 is folded.

With reference to FIGS. 1, 2 and 4A–4C, the frame 20 has a front plate 21, a rear plate 22 and a pair of folding end plates 23 to form a substantially rectangular structure. Each end plate 23 has two sections 24 and two side edges 25. The side edges 25 are each pivotally mounted to the front and rear plates 21 and 22 respectively by a hinge 26, thereby enabling a user thereof to modify the shape of the structure. Centrally disposed within each end plate 23 is another hinge 26 which can be folded to collapse the frame 20. Although each end plate 23 can be folded away from the front and rear plates 21 and 22, preferably the frame 20 is folded with the end plates 23 projecting inwardly toward one another, as shown in FIGS. 4A–4C. To prevent the end plate 23 from folding outwardly, a stop 27 is mounted to one of the sections 24 of the end plate 23 within the interior 12 adjacent the centrally disposed hinge 25. The stop 27 removably engages the other section 24 of the end plate 23 upon outward movement thereof. At the upper most portion, the frame 20 has a top edge 28. Likewise, at the lower most portion, the frame 20 has a bottom edge 29 which is removably engagable with a supporting surface (not shown). The front and rear plates 21 and 22 preferably have substantially equal predetermined lengths and widths. The length of the front and rear plates 21 and 22 is defined by the distance between the ends thereof which are pivotally mounted to the end plates 23. The width is defined by the distance between the top and bottom edges 28 and 29.

Continuing to refer to FIGS. 1 and 2, the tray 30 has an elongated, rectangular shape and is capable of removably receiving the folded frame 20. Preferably, the tray 30 has substantially the same predetermined length as the front and rear plates 21 and 22. The tray 30 comprises a substantially planar platform 32 having outer ends 34, outer edges 36 and sides 38 extending outwardly from the outer edges 36 substantially perpendicular to the platform 32. Preferably, the distance between the outer edges 36 is substantially the same as or greater than the width of the front and rear plates 21 and 22. In this manner, the folded frame 20 can be removably inserted into the tray 30 with the sides 38 removably engaging the top and bottom edges 28 and 29 and the platform removably engaging the either the front or rear plates 21 and 22. As particularly shown in FIG. 1, by placing the tray 30 within the interior 12 of the frame 20 so that the sides 38 removably engage the supporting surface, the outer ends 34 can removably engage the end plates 23 to prevent the end plates 23 from folding toward each other while in use, thereby maintaining the frame 20 in a substantially rectangular shape and adding rigidity thereto. Additionally, the heat source 4 can be placed upon the platform, which is vertically elevated with respect to the supporting surface and thus acts a fire or heat barrier to the supporting surface.

As shown in FIGS. 1–3, the top member 40 is removably stackable onto the top edge 28 of the frame 20. The top member 40 has a peripheral edge 41, a bottom surface 42, a peripheral wall 43 extending outwardly from the bottom surface 42 proximate the peripheral edge 41, and a top surface 44. As the top member 40 is being placed upon the frame 20, the peripheral wall 43 slidably engages the front, rear and end plates 21, 22 and 23 until the bottom surface 42 removably engages the top edge 28. Once the top member 40 is in place upon the frame 20, the peripheral wall 43 prevents the end plates 23 from folding outwardly, and in combination with the tray 30 engaging the end plates 23, the steam table 10 becomes substantially rigid.

With continued reference to FIGS. 1–3, the top member 40 comprises a C-shaped first shell 45 and a C-shaped second shell 46. Each of the first and second shells 45 and 46 have an extension member 47 and a first arm 48, a second arm 49 and a third arm 50 extending outwardly from and substantially perpendicular to the extension member 47. Although preferred, the third arm 50, is not required and the first and second shells 45 and 46 may be manufactured with only the respective first and second arms 48 and 49. The third arm 50 adds additional structural support to the top member 40. Additionally, the third arm 50 is disposed substantially equal distantly between the first and second arms 48 and 49. Each of the first, second and third arms 48, 49 and 50 have a pivot end 51 and a plurality of protrusions 52 extending outwardly from the bottom surface 42 proximate the pivot ends 51. Preferably, the third arm 50 has a pair of space-apart protrusions 52 proximate the pivot ends 51. To enable the top member 40 to be foldable, the protrusions 52 of the first, second and third arms 48, 49 and 50 of the first shell 45 are matingly and pivotally mounted to the respective protrusions 52 of the first, second and third arms 48, 49 and 50 of the second shell 46. Preferably, the portion of the peripheral wall 43 adjacent the first and second arms 48 and 49 of the first shell 45 are respectively pivotally mounted to the portion of the peripheral wall 43 adjacent the first and second arms 48 and 49 of the second shell 46.

Proximate the intersections of the respective first, second and third arms 48, 49 and 50 and the extension members 47 of both the first and second shells 45 and 46 are a plurality of tabs 53 extending outwardly from the bottom surface 42. The respective protrusions 52 and tabs 53 of the first, second and third arms 48, 49 and 50 are spaced-apart a predetermined distance to enable the tabs 53 to removably engage one side 38 of the tray 30 and the protrusions 52 to removably engage the other side 38 of the tray 30.

Again referring to FIG. 1, the first and third arms 48 and 50 and the extension members 47 respectively of the first and second shells 45 and 46 define an opening 54. Likewise, the second and third arms 49 and 50 and the extension members 47 respectively of the first and second shells 45 and 46 define another opening 54. Pans 2 may be removably inserted into the opening 54 so that the lips 3 thereof removably engage the top surface 44 and thereby supported by the top member 40. With an embodiment of the top member 40 absent the third arm 50, as described above, the opening 54 is defined by the first and second arms 48 and 49 and the extension members 47 respectively of the first and second shells 45 and 46. Also, it is clear that the top member 40 can be manufactured having a plurality of arms to provide multiple openings 54 for pans 2.

Referring to FIGS. 5 and 6, with additional reference to FIGS. 1–3 and 4A–4C, the first and second shell 45 and 46 are configured so the peripheral wall 43 of the second shell 46 is removably disposable within the peripheral wall 43 of the first shell 45 when the top member 40 is folded. Clearly, the first and second shell 45 and 46 may be configured so the peripheral wall 43 of the first shell 45 is removably disposable within the peripheral wall 43 of the second shell 46 when the top member 40 is folded. To store the steam table 10, the tray 30 is placed between the protrusions 52 and the tabs 53 of the first, second and third arms 48, 49 and 50 and the peripheral walls 34 of the first and second arms 48 and 49 of either one of the shells 45 or 46. Next, the folded frame 20 is placed within the sides 38 of the tray 30 so that one of plates 21 or 22 engage the platform. Preferably, another tray 30 is placed onto the other plate 21 or 22 of the folded frame 20. By disposing the frame 20 between the trays 30, the front and rear plates 21 and 22 are provided protection from dents or unsightly scaring that can occur during transit. Finally, the opposite shell 45 or 46 is pivoted so that its protrusions 52 and tabs 53 likewise engage the trays 30 and the folded frame 40 until the inner most peripheral wall 43 engages the outer most shell's 45 or 46 bottom surface 42 to secure the trays 30 and frame 20 within the folded top member 40. It is evident that the frame 20 is placeable within the protrusions 52 and tabs 53 of the shells 45 and 46 without any trays 30.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A collapsible and nestable steam table capable of supporting at least one pan, comprising:

a foldable frame having a front plate, a rear plate and a pair of folding end plates forming a substantially rectangular structure, the end plates each having two side edges each pivotally mounted to the front and rear plates respectively and a centrally disposed hinge which can be folded to collapse the frame, and the frame having a top edge and a bottom edge;

at least one elongated tray being removably disposed within the frame and removably engagable with the end plates proximate the bottom edge to prevent the end plates from folding toward each other, the at least one tray having a substantially planar platform, the platform having outer edges and sides extending outwardly from the outer edges substantially perpendicular to the platform, the sides removably engagable with the top and bottom edges of the frame respectively; and a foldable top member for both supporting the at least one pan and receiving and securing the frame and the at least one tray therein, the top member having a peripheral edge, a bottom surface and a peripheral wall extending outwardly from the bottom surface proximate the peripheral edge and comprising a C-shaped first shell and a C-shaped second shell, the first and second shells each having an extension member and a first arm, a second arm and a third arm extending outwardly therefrom, the first, second and third arms each having a pivot end and a plurality of protrusions extending outwardly from the bottom surface proximate the pivot ends, the protrusions of the first, second and third arms of the first shell being respectively pivotally mounted to the protrusions of the first, second and third arms of the second shell thereby enabling the top member to be foldable, the first and second shells having a plurality of tabs extending outwardly from the bottom surface proximate the intersections of the respective first, second and third arms and the extension members, and the respective protrusions and tabs of the first, second and third arms being spaced-apart a predetermined distance so that the tabs are removably engagable with one side of the at least one tray and the protrusions are removably engagable with the other side of the at least one tray, whereby the at least one tray and the frame are secured within the top member by removably disposing the at least one tray between the tabs and protrusions of the first, second and third arms and the peripheral walls of the first and second arms of the first shell, the folded frame is removably disposed within the sides of the at least one tray, and the second shell is pivoted so that the tabs of the first, second and third arms thereof removably engage the sides of the at least one tray.

2. A collapsible and nestable steam table comprising:

a foldable top member having a first shell pivotally mounted to a second shell, the first and second shells in combination defining at least one opening to releasably receive a pan;

collapsible means for supporting the top member, the collapsible means being removably placeable within the folded first and second shells for storage; and wherein the top member has a peripheral edge, a bottom surface and a peripheral wall extending outwardly from the bottom surface proximate the peripheral edge, and the bottom surface removably engages the collapsible means and the peripheral wall retains the collapsible means within the folded top member while being stored therein.

3. A steam table as claimed in claim 2, further comprising:

securing means for securing the collapsible means from movement within the first and second shells while being stored therein.

4. A steam table as claimed in claim 3, wherein the top member has a peripheral edge, a bottom surface and a peripheral wall extending outwardly from the bottom surface proximate the peripheral edge, and the bottom surface removably engages the collapsible means and the peripheral wall retains the collapsible means within the folded top member while being stored therein.

5. A steam table as claimed in claim 4, wherein the first and second shells are C-shaped and each have an extension member and a first arm and a second arm extending outwardly from the extension member, the first and second arms each have a pivot end, and the first and second arms proximate the pivot ends thereof of the first shell are respectively pivotally mounted to the first and second arms proximate the pivot ends thereof of the second shell.

6. A steam table as claimed in claim 5, wherein the top member has a bottom surface, the first and second arms of the first and second shell each have at least one protrusion extending outwardly from the bottom surface proximate the pivot end, the protrusions of the first and second arms of the first shell being respectively pivotally mounted to the protrusions of the first and second arms of the second shell, the first and second arms of the first and second shells each have at least one tab extending outwardly from the bottom surface, and the respective protrusions and tabs of the first and second arms are spaced-apart a predetermined distance so that the collapsible means is removably disposable therebetween, whereby the protrusions and the tabs of the first and second shells and the perimeter wall secure the collapsible means from movement within the first and second shells while being stored therein by folding the first and second shells into removable contact with each other.

7. A steam table as claimed in claim 4, wherein the first and second shells are C-shaped and each have an extension member and a first arm, a second arm and a third arm extending outwardly from the extension member, the first, second and third arms each have a pivot end, and the first, second and third arms proximate the pivot ends thereof of the first shell are respectively pivotally mounted to the first, second and third arms proximate the pivot ends thereof of the second shell.

8. A steam table as claimed in claim 7, wherein the first, second and third arms of the first and second shell each have at least one protrusion extending outwardly from the bottom surface proximate the pivot end, the protrusions of the first, second and third arms of the first shell being respectively pivotally mounted to the protrusions of the first, second and third arms of the second shell, the first, second and third arms of the first and second shells each have at least one tab extending outwardly from the bottom surface, and the respective protrusions and tabs of the first, second and third arms are spaced-apart a predetermined distance so that the collapsible means is removably disposable therebetween, whereby the protrusions and the tabs of the first and second shells and the perimeter wall secure the collapsible means from movement within the first and second shells while being stored therein by folding the first and second shells into removable contact with each other.

9. A steam table as claimed in claim 3, wherein the first and second shells are C-shaped and each have an extension member and a first arm, a second arm and a third arm extending outwardly from the extension member, the first, second and third arms each have a pivot end, and the first, second and third arms proximate the pivot ends thereof of the first shell are respectively pivotally mounted to the first, second and third arms proximate the pivot ends thereof of the second shell.

10. A steam table as claimed in claim 9, wherein the top member has a bottom surface, the first, second and third arms of the first and second shell each have at least one protrusion extending outwardly from the bottom surface proximate the pivot end, the protrusions of the first, second and third arms of the first shell being respectively pivotally mounted to the protrusions of the first, second and third arms of the second shell, the first, second and third arms of the first and second shells each have at least one tab extending outwardly from the bottom surface, and the respective protrusions and tabs of the first, second and third arms are spaced-apart a predetermined distance so that the collapsible means is removably disposable therebetween, whereby the protrusions and the tabs of the first and second shells and the perimeter wall secure the collapsible means from movement within the first and second shells while being stored therein by folding the first and second shells into removable contact with each other.

11. A steam table as claimed in claim 3, wherein the first and second shells are C-shaped and each have an extension member and a first arm and a second arm extending outwardly from the extension member, the first and second arms each have a pivot end, and the first and second arms proximate the pivot ends thereof of the first shell are respectively pivotally mounted to the first and second arms proximate the pivot ends thereof of the second shell.

12. A steam table as claimed in claim 11, wherein the top member has a bottom surface, and the securing means comprises the first and second arms of the first and second shell each have at least one protrusion extending outwardly from the bottom surface proximate the pivot end, the protrusions of the first and second arms of the first shell being respectively pivotally mounted to the protrusions of the first and second arms of the second shell, the first and second arms of the first and second shells each have at least one tab extending outwardly from the bottom surface, and the respective protrusions and tabs of the first and second arms are spaced-apart a predetermined distance so that the collapsible means is removably disposable therebetween.

13. A steam table as claimed in claim 2, wherein the first and second shells are C-shaped and each have an extension member and a first arm and a second arm extending outwardly from the extension member, the first and second arms each have a pivot end, and the first and second arms proximate the pivot ends thereof of the first shell are respectively pivotally mounted to the first and second arms proximate the pivot ends thereof of the second shell.

14. A steam table as claimed in claim 13, wherein the top member has a bottom surface, the first and second arms of the first and second shell each have at least one protrusion extending outwardly from the bottom surface proximate the pivot end, the protrusions of the first and second arms of the first shell being respectively pivotally mounted to the protrusions of the first and second arms of the second shell, the first and second arms of the first and second shells each have at least one tab extending outwardly from the bottom surface, and the respective protrusions and tabs of the first and second arms are spaced-apart a predetermined distance so that the collapsible means is removably disposable therebetween.

15. A steam table as claimed in claim 14, wherein the tabs are disposed proximate respective intersections of the first and second arms with the extension member of both the first and the second shells.

16. A steam table as claimed in claim 2, wherein the first and second shells are C-shaped and each have an extension member and a first arm and a second arm extending outwardly from the extension member, the first and second arms each have a pivot end, and the first and second arms proximate the pivot ends thereof of the first shell are respectively pivotally mounted to the first and second arms proximate the pivot ends thereof of the second shell.

17. A steam table as claimed in claim 16, wherein the first and second arms of the first and second shell each have at least one protrusion extending outwardly from the bottom surface proximate the pivot end, the protrusions of the first and second arms of the first shell being respectively pivotally mounted to the protrusions of the first and second arms of the second shell, the first and second arms of the first and second shells each have at least one tab extending outwardly from the bottom surface, and the respective protrusions and tabs of the first and second arms are spaced-apart a predetermined distance so that the collapsible means is removably disposable therebetween, whereby the protrusions and the tabs of the first and second shells and the perimeter wall secure the collapsible means from movement within the first and second shells while being stored therein by folding the first and second shells into removable contact with each other.

18. A steam table as claimed in claim 2, wherein the first and second shells are C-shaped and each have an extension member and a first arm, a second arm and a third arm extending outwardly from the extension member, the first, second and third arms each have a pivot end, and the first, second and third arms proximate the pivot ends thereof of the first shell are respectively pivotally mounted to the first, second and third arms proximate the pivot ends thereof of the second shell.

19. A steam table as claimed in claim 18, wherein the top member has a bottom surface, the first, second and third arms of the first and second shell each have at least one protrusion extending outwardly from the bottom surface proximate the pivot end, the protrusions of the first, second and third arms of the first shell being respectively pivotally mounted to the protrusions of the first, second and third arms of the second shell, the first, second and third arms of the first and second shells each have at least one tab extending outwardly from the bottom surface, and the respective protrusions and tabs of the first, second and third arms are spaced-apart a predetermined distance so that the collapsible means is removably disposable therebetween, whereby the protrusions and the tabs of the first and second shells and the perimeter wall secure the collapsible means from movement within the first and second shells while being stored therein by folding the first and second shells into removable contact with each other.

20. A steam table as claimed in claim 2, wherein the first and second shells are C-shaped and each have an extension member and a first arm, a second arm and a third arm extending outwardly from the extension member, the first, second and third arms each have a pivot end, and the first, second and third arms proximate the pivot ends thereof of the first shell are respectively pivotally mounted to the first, second and third arms proximate the pivot ends thereof of the second shell.

21. A steam table as claimed in claim 20, wherein the first, second and third arms of the first and second shell each have at least one protrusion extending outwardly from the bottom surface proximate the pivot end, the protrusions of the first, second and third arms of the first shell being respectively pivotally mounted to the protrusions of the first, second and third arms of the second shell, the first, second and third arms of the first and second shells each have at least one tab extending outwardly from the bottom surface, and the respective protrusions and tabs of the first, second and third arms are spaced-apart a predetermined distance so that the collapsible means is removably disposable therebetween, whereby the protrusions and the tabs of the first and second shells and the perimeter wall secure the collapsible means from movement within the first and second shells while being stored therein by folding the first and second shells into removable contact with each other.

* * * * *